United States Patent [19]
Lebby et al.

[11] Patent Number: 5,540,799
[45] Date of Patent: Jul. 30, 1996

[54] METHOD OF FABRICATING OPTICAL WAVEGUIDE FROM A LAMINATE

[75] Inventors: Michael S. Lebby, Apache Junction; Davis H. Hartman, Phoenix, both of Ariz.

[73] Assignee: Motorola, Schaumburg, Ill.

[21] Appl. No.: 332,154

[22] Filed: Oct. 31, 1994

[51] Int. Cl.$^6$ ............................................. B29D 11/00
[52] U.S. Cl. ............................ 156/245; 264/1.24; 264/2.7
[58] Field of Search ................................ 264/1.24, 1.25, 264/2.7; 358/131, 132, 143, 145; 156/245

[56] References Cited

U.S. PATENT DOCUMENTS

| | | | |
|---|---|---|---|
| 3,728,422 | 4/1973 | Sugaya | 264/1.24 |
| 5,046,800 | 9/1991 | Blyler, Jr. et al. | 385/131 |
| 5,265,184 | 11/1993 | Lebby et al. | 385/132 |
| 5,271,083 | 12/1993 | Lebby et al. | 385/131 X |

Primary Examiner—Michael W. Ball
Assistant Examiner—Richard Crispino
Attorney, Agent, or Firm—Eugene A. Parsons

[57] ABSTRACT

A method of fabricating optical waveguides includes providing first, second and third layers of material, with the second layer being clear and the first and third layers having an index of refraction at least 0.01 lower than the second layer. A laminate of the layers of material is formed with the second layer sandwiched between the first and third layers and the laminate is heated until plastic and pressed together at spaced apart locations to form the second layer into at least one optical waveguide core with the first and third layers forming cladding layers therearound.

10 Claims, 2 Drawing Sheets

METHOD OF FABRICATING OPTICAL WAVEGUIDE FROM A LAMINATE

FIELD OF THE INVENTION

This invention relates, in general, to optical waveguides and, more particularly, to fabrication of molded optical waveguides.

BACKGROUND OF THE INVENTION

At the present time, fabrication of optical waveguides is achieved by either a polymer spin-on technique or a diffusion technique, both of which require expensive photolithography steps. Additionally, both fabrication techniques are ineffective and inefficient for fabricating optical waveguides in high volumes for several reasons, such as complex processing steps, difficulties in controlling the processing steps, and high cost.

In U.S. Pat. No. 5,265,184, entitled "Molded Waveguide and Method For Making Same", issued Nov. 23, 1993, new molded waveguides are disclosed which are fabricated by molding upper and lower cladding layers with grooves defined therebetween. Optical waveguides are formed by filling the grooves with an optically clear adhesive which forms the core of the optical waveguide and simultaneously fixes the upper and lower cladding layers together.

One problem which arises with the molded optical waveguide described in the '184 Patent is the filling of the grooves without introducing bubbles into the liquid adhesive. If an air bubble is formed in the liquid adhesive and the air bubble remains in the groove after fixing the upper and lower cladding layers together, the core of the waveguide will not conduct light properly.

Also, since the upper and lower cladding layers surround the core and form the optical waveguide in conjunction with the core, the upper and lower cladding layers are generally molded from optical quality, transparent epoxies or the like which have a refractive index slightly lower than the refractive index of the core. Thus, to provide the optimum efficiency the upper and lower cladding layers are formed of relatively expensive plastic material.

Therefore, an optical waveguide which could be fabricated by utilizing a cheaper plastic material in the bulk volumes would be highly desirable.

It is a purpose of the present invention to provide a new and improved optical waveguide.

It is another purpose of the present invention to provide a new and improved optical waveguide which is less expensive.

It is still another purpose of the present invention to provide a new and improved optical waveguide which is simple and efficient to fabricate.

It is a further purpose of the present invention to provide a new and improved optical waveguide which can be easily incorporated into other molding processes.

SUMMARY OF THE INVENTION

The above problems and others are at least partially solved and the above purposes and others are realized in a method of fabricating optical waveguides including providing first, second and third layers of material, with the second layer being optically clear and having a first index of refraction and the first and third layers having an index of refraction at least 0.01 lower than the first index of refraction. The first, second and third layers further each have a first temperature at which they become plastic. A laminate of the first, second and third layers of material is formed with the second layer sandwiched between the first and third layers and the laminate is heated to the first temperature so as to make the first, second and third layers plastic. The laminate, heated to the first temperature, is then pressed together at spaced apart locations to form the second layer into at least one optical waveguide core with the first and third layers forming cladding layers therearound.

The above problems and others are at least partially solved and the above purposes and others are further realized in an optical waveguide including first, second and third layers of material, the second layer being optically clear and having a first index of refraction and the first and third layers having an index of refraction at least 0.01 lower than the first index of refraction, the first, second and third layers of material being formed into a laminate with the second layer sandwiched between the first and third layers, and the laminate being pressed together at spaced apart locations to form the second layer into at least one optical waveguide core with the first and third layers forming cladding layers therearound and all of the first, second and third layers being bonded together.

BRIEF DESCRIPTION OF THE DRAWINGS

Referring to the drawings.

DESCRIPTION OF THE PREFERRED EMBODIMENT

Figure 1:
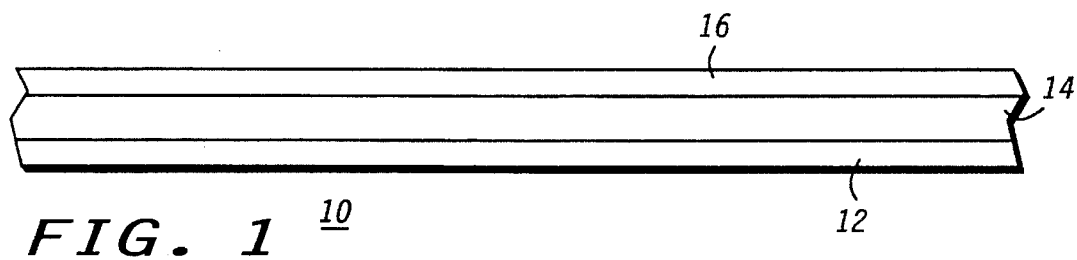
FIG. 1 is a sectional view of a laminate in accordance with the present invention.

Referring specifically to FIG. 1, a laminate 10 is illustrated in a sectional view. Laminate 10 includes a first layer 12, a second layer 14 and a third layer 16 of material, which in this specific embodiment is adhesive material. Second layer 14 is optically clear and has a first index of refraction and first layer 12 and third layer 16 have an index of refraction at least 0.01 lower than the first index of refraction. Generally, the indexes of refraction of the materials in layers 12, 14 and 16 range from approximately 1.50 to 1.54. In a preferred embodiment, layers 12 and 16 are formed of the same material so that the characteristics of the material remain similar. First, second and third layers 10, 12 and 16 are formed into laminate 10 with second layer 14 sandwiched between first and third layers 12 and 16. Generally, layers 12, 14 and 16 have temperature coefficients which are substantially similar so that severe delamination will not occur during large temperature changes.

As will be explained presently, the thicknesses of each of layers 10, 12 and 16 depends upon the remaining operations in the fabrication process. However, in one embodiment second layer 14 has a thickness of 40 μm while layers 12 and 16 have a thickness of 10 μm.

Figure 2:
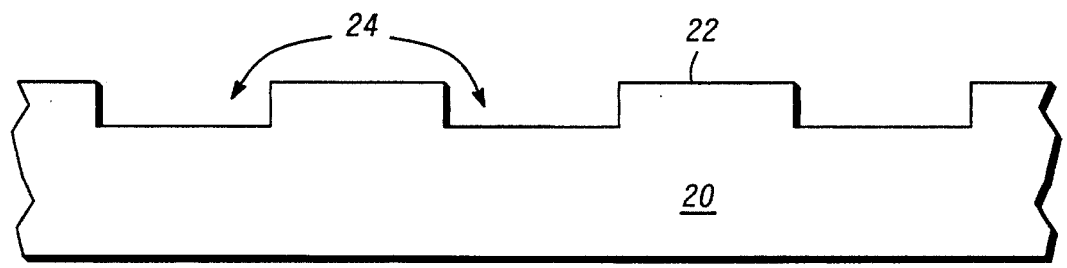
FIG. 2 is a simplified sectional view of a form used in fabricating optical waveguides from the laminate of FIG. 1.

Referring specifically to FIG. 2, a sectional view of a form 20 used in fabricating optical waveguides from the laminate of FIG. 1 is illustrated. Form 20 is constructed from any convenient material which, preferably, is inexpensive and easy to provide in the desired shape. Form 20 includes a generally planar surface 22 and a plurality of grooves 24 formed in planar surface 22. In the present embodiment, grooves 24 are generally rectangular in cross-section and are evenly spaced apart on surface 22. Also, in one embodiment grooves 24 are formed less than approximately 100.0 microns wide and 100.0 microns deep so that the core of the optical waveguide ultimately formed therein is approximately 50.0 microns wide and 50.0 microns deep.

Form 20 with grooves 24 is produced by any convenient method, including molding (see for example the '184 Patent referred to above), machining, micro-machining, etc. Because form 20 can be formed, for example, by molding inexpensive material, grooves 24 can be produced in any desired shape and additional material (e.g. leadframes and the like) can be easily incorporated into form 20. Also, the method utilized to produce form 20 may dictate, or at least partially dictate, the material composing form 20. In a specific embodiment form 20 is constructed by molding and the material utilized is standard black molding compound commonly used in transfer molding of electronic components. Further, in some of the embodiments to be disclosed herein, the material of form 20 has a temperature coefficient substantially similar to or approximately the same as the temperature coefficient of laminate 10.

Figure 3:
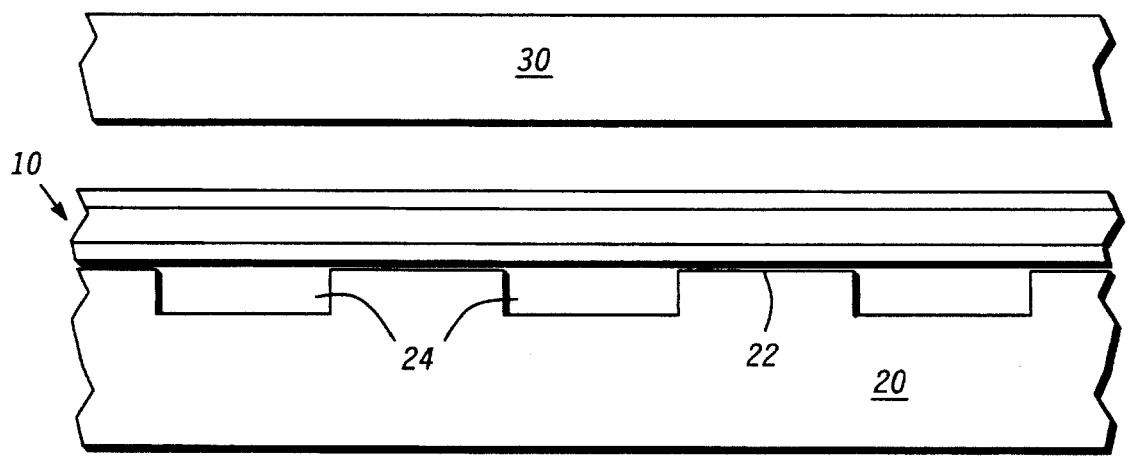
FIG. 3 illustrates the laminate of FIG. 1 positioned on the form of FIG. 2 with an optional cap or pressure plate.

Referring to FIG. 3, laminate 10 is positioned on planar surface 22 of form 20 and a cap or pressure plate 30 is positioned over laminate 10. First, second and third layers 12, 14 and 16 are chosen so as to have a temperature at which they become plastic and easily moldable. Generally, it is preferred to select materials for each of layers 12, 14 and 16 which reach the desired plastic state at approximately the same temperature, or within a few degrees of each other, but they can be blended to ensure a wide temperature range over which they soften but do not melt and for which inter diffusion is limited. Laminate 10 is heated by any convenient means, such as an oven, microwaves, heating elements in pressure plate 30, etc.

Figure 4:
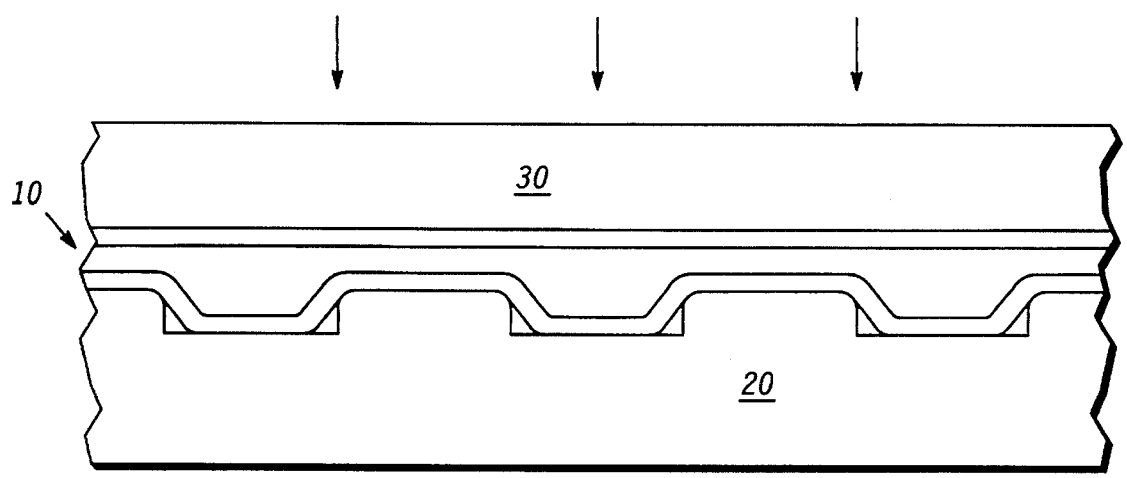
FIGS. 4 and 5 illustrate phases of the continuing process.
Figure 5:
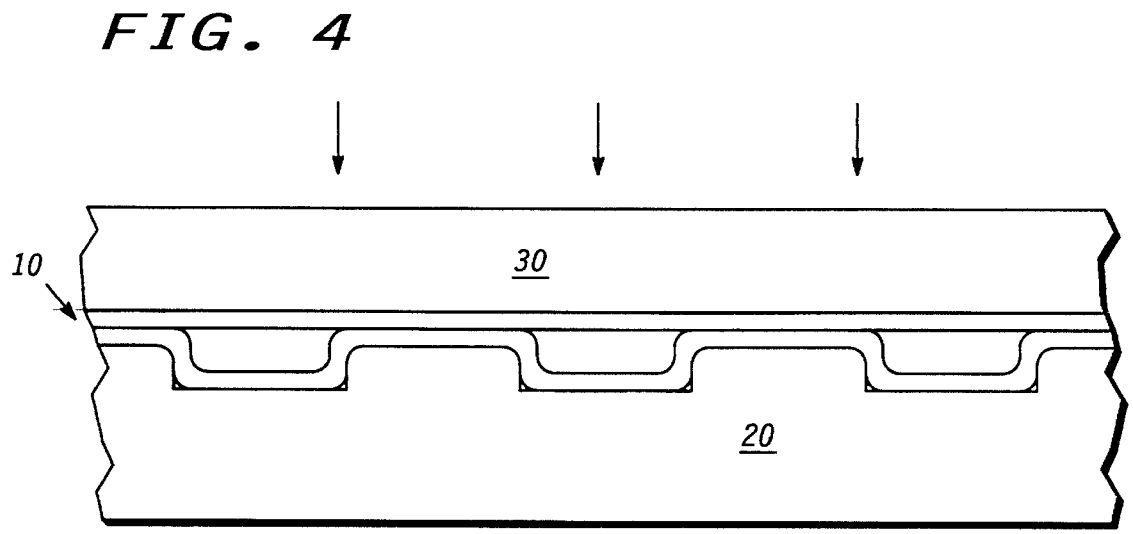

When laminate 10 reaches the proper plasticity, pressure plate 30 is gradually pressed toward surface 22 of form 20, as illustrated in FIGS. 4 and 5. As pressure plate 30 moves toward form 20, laminate 10 is gradually forced into grooves 24. The materials of layers 12, 14 and 16 are chosen so that when laminate 10 flows into grooves 24 the materials substantially retain their relative positions. Thus, a portion of center layer 14 gradually becomes surrounded by layers 12 and 16.

Figure 6:
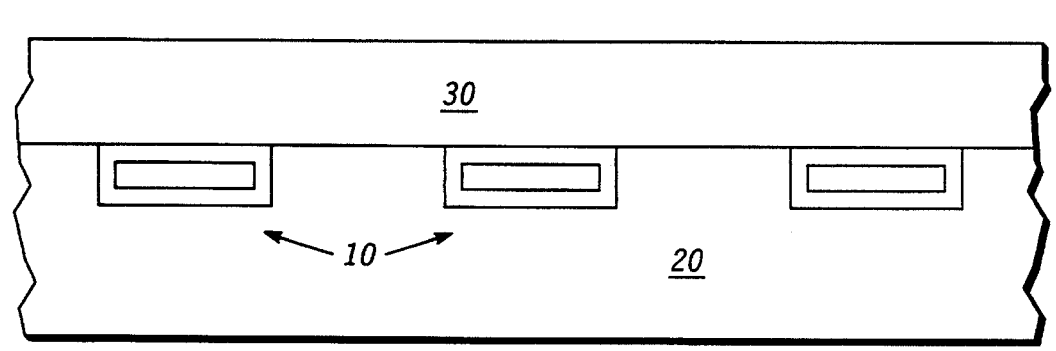
FIG. 6 illustrates a complete optical waveguide in accordance with the present invention.

Referring to FIG. 6, pressure plate 30 has been forced into a position in which it is in contact with, or substantially in contact with, surface 22 of form 20. In this position each groove 24 contains a portion of center layer 14 completely surrounded by layers 12 and 16. This portion of center layer 14 is the core of an optical waveguide and the portions of layers 12 and 16 act as cladding layers. Any excess material from layers 12, 14 and 16 is simply squeezed out the sides (not shown) and discarded. Through a careful design of form 20 and through careful selection of the thicknesses of layers 12, 14 and 16, the amount of excess material is minimized.

With laminate 10 properly positioned in grooves 24, the heat is increased to a second temperature at which the material of layers 12, 14 and 16 is cured and hardened. It is generally preferred that the second or curing temperature is relatively well defined at which the materials of layers 12, 14 and 16 melt and snap cure quickly thereafter. In this specific embodiment, when laminate 10 is cured layers 12, 14 and 16 adhere firmly together and, also, laminate 10 adheres firmly to form 20. If desired, pressure plate 30 can also be formed so as to adhere firmly in the position illustrated in FIG. 6 and can provide a permanent protective cap over the upper surface 22 and grooves 24. If form 20 is to be a permanent portion of the optical waveguide, it is preferable that form 20 (and pressure plate 30 if retained) has a temperature coefficient substantially similar to or approximately the same as the temperature coefficient of laminate 10.

It will of course be understood that in a somewhat different embodiment pressure plate 30 is stopped before it actually comes in contact with surface 22 of form 20. This action will leave a connecting arm between optical waveguides. In this embodiment, once laminate 10 is cured and hardened, both pressure plate 30 and form 20 can be removed, if desired. In this embodiment pressure plate 30 and form 20 are constructed of a material (e.g. stainless steel or other metal) which does not adhere to laminate 10.

Laminate 10 generally is manufactured as a sheet laminate with layers 12, 14 and 16 each being, for example, a polymer adhesive that stick together in the laminate under normal ambient conditions. Laminate 10 can either be manufactured or cut into a sheet roll, or long strips, of material, similar to rolls of cellophane tape. The strips of laminate 10 can then be payed out as needed to provide a virtually continuous manufacturing process.

This method of fabricating optical waveguides has a number of advantages over prior art methods and over the method disclosed in the above cited '184 Patent. Because laminate 10 contains material for both the core and cladding regions of the optical waveguide, form 20, and pressure plate 30 if retained, can be composed of, for example, standard black molding compound. Further, because solid laminate 10 is used, rather than a liquid adhesive, material handling during manufacturing is significantly simplified. Also, because laminate 10 is embedded into grooves 24 of form 20, formation of bubbles or introduction of other foreign matter into the structure is either reduced significantly, rendered inconsequential, or both. Thus, optical waveguides can be manufactured in virtually any form and in very large quantities.

While we have shown and described specific embodiments of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

What is claimed is:

1. A method of fabricating optical waveguides comprising the steps of:

providing first, second and third layers of material, the second layer being optically clear and having a first index of refraction and the first and third layers having an index of refraction at least 0.01 lower than the first index of refraction, the first, second and third layers further each having a first temperature at which they become plastic;

forming a laminate of the first, second and third layers of material with the second layer sandwiched between the first and third layers;

heating the laminate to the first temperature so as to make the first, second and third layers plastic; and pressing the laminate, heated to the first temperature, together at spaced apart locations to squeeze the first, second and third layers of material out of the spaced apart locations so as to form the second layer into at least one optical waveguide core with the first and third layers forming cladding layers therearound.

2. A method of fabricating optical waveguides as claimed in claim 1 wherein the first, second and third layers are formed of an adhesive material.

3. A method of fabricating optical waveguides as claimed in claim 2 wherein the first and third layers are formed of a similar adhesive material.

4. A method of fabricating optical waveguides as claimed in claim 1 wherein the indices of refraction of the first, second and third layers are in the range of approximately 1.50 to 1.54.

5. A method of fabricating optical waveguides as claimed in claim 1 wherein the first, second and third layers each have a second temperature at which they cure into a final product and bond together and the method includes a final step of curing the first, second and third layers at the second temperature.

6. A method of fabricating optical waveguides as claimed in claim 1 wherein the first, second and third layers each have a second temperature at which they cure into a final product and bond together and to the form, and the method includes a final step of curing the first, second and third layers at the second temperature.

7. A method of fabricating optical waveguides comprising the steps of:

providing first, second and third layers of material, the second layer being optically clear and having a first index of refraction and the first and third layers having an index of refraction at least 0.01 lower than the first index of refraction, the first, second and third layers further each having a first temperature at which they become plastic;

forming a laminate of the first, second and third layers of material with the second layer sandwiched between the first and third layers;

providing a form having a planar surface and an elongated groove formed in the planar surface;

heating the laminate to the first temperature so as to make the first, second and third layers plastic; and placing the heated laminate on the planar surface of the form and pressing the laminate, heated to the first temperature, to move the first, second and third layers of material of the laminate from the planar surface and into the groove in the planar surface of the form to mold the second layer into at least one optical waveguide core with the first and third layers forming cladding layers therearound in the groove.

8. A method of fabricating optical waveguides as claimed in claim 7 wherein the first, second and third layers each have a second temperature at which they cure into a final product and bond together and to the form, and the method includes a final step of curing the first, second and third layers at the second temperature.

9. A method of fabricating optical waveguides as claimed in claim 7 wherein the step of providing a form includes molding the form from plastic material.

10. A method of fabricating optical waveguides as claimed in claim 8 wherein the step of pressing the laminate, heated to the first temperature, into the groove includes providing a cap which mates with the planar surface of the form and using the cap to press the laminate into the groove.

* * * * *